(12) United States Patent
Roy (10) Patent No.: US 9,827,158 B1
(45) Date of Patent: Nov. 28, 2017

(54) CREMATION URN AND METHODS OF MANUFACTURE

(71) Applicant: Donald Roy, Agawam, MA (US)

(72) Inventor: Donald Roy, Agawam, MA (US)

(*) Notice: Subject to any disclaimer, the term of this patent is extended or adjusted under 35 U.S.C. 154(b) by 0 days.

(21) Appl. No.: 15/395,831

(22) Filed: Dec. 30, 2016

(51) Int. Cl.
*A61G 17/08* (2006.01)
*A61G 17/007* (2006.01)
*B29C 49/00* (2006.01)

(52) U.S. Cl.
CPC ......... *A61G 17/08* (2013.01); *A61G 17/0076* (2013.01); *B29C 49/00* (2013.01)

(58) Field of Classification Search
CPC ...... A61G 17/00; A61G 17/007; A61G 17/08; B29C 43/203; B29C 45/16; B29C 49/00; B29C 39/12; B29C 41/22
USPC ................................... 27/1, 7; 264/241, 250
See application file for complete search history.

(56) References Cited

U.S. PATENT DOCUMENTS

| | | |
|---|---|---|
| 900,980 A | 10/1908 | Callahan et al. |
| 1,048,361 A | 12/1912 | Sievert |
| 1,454,427 A | 5/1923 | Cunning |
| 1,484,896 A | 2/1924 | Mannix |
| 1,903,197 A | 3/1933 | Scott |
| 1,974,666 A | 9/1934 | Scott |
| 2,261,651 A | 11/1941 | Lambert |
| 2,562,726 A * | 7/1951 | MacDonald .......... E04H 13/006 215/12.1 |
| 3,654,675 A * | 4/1972 | Peterson ................ E04H 13/006 220/618 |
| 3,654,676 A | 4/1972 | McHugh |
| 4,170,054 A | 10/1979 | Ruffner et al. |
| 4,320,562 A | 3/1982 | Kelley |
| 4,372,018 A | 2/1983 | Miller, IV et al. |
| 4,823,448 A | 4/1989 | Martin |
| 4,854,018 A | 8/1989 | Von Bratt |
| 5,157,817 A | 10/1992 | Davidian |
| 5,203,810 A | 4/1993 | Davidian |
| 5,245,733 A | 9/1993 | Goria |
| 5,379,499 A | 1/1995 | Jackson |
| 5,722,133 A | 3/1998 | Farris et al. |
| 5,732,452 A | 3/1998 | Riedel, II |
| D400,683 S | 11/1998 | Saaf et al. |
| 6,145,175 A | 11/2000 | Enneking et al. |
| 8,046,881 B2 * | 11/2011 | Johnson ................. A61G 17/08 27/1 |
| 2009/0020488 A1 | 1/2009 | Turkel |
| 2010/0088866 A1 | 4/2010 | Fifer et al. |
| 2013/0125357 A1 | 5/2013 | Drew et al. |
| 2014/0000075 A1 | 1/2014 | Catlitt |
| 2014/0090216 A1 | 4/2014 | Kotila et al. |

* cited by examiner

*Primary Examiner* — William Miller (57) ABSTRACT

A cremation urn comprising an internal structure with an opening, an external opening with an opening that is correspondingly aligned with the opening on the internal structure, and sealing means in the form of a threaded lid or press fit lid. A threaded flange is attached to the opening on the internal structure and is molded into the urn during manufacturing. The materials used for the urn produce an urn with the appearance of marble. Once the urn is made, by use of a manufacturing method, the threaded lid is screwed into the threaded flange, thereby creating a one-piece, air-tight and water-tight cremation urn.

6 Claims, 6 Drawing Sheets

FIG.11

CREMATION URN AND METHODS OF MANUFACTURE

TECHNICAL FIELD

The invention generally pertains to burial or cremation urns, and more particularly to a one-piece, seamless cremation urn having an internal structure for maintaining ashes surrounded by an external decorative and support structure.

BACKGROUND ART

Throughout the world there are numerous methods of dealing with a person after they have died. For thousands of years one of the most widely used methods has been to bury the corpse of a dead person, with a marker such as a tombstone indicating where a person is buried. Eventually, in cities or towns where large groups of people live certain areas have been where designated so that many corpses could be buried in one location. These locations came to be called a cemetery. There were also alternative locations such as below-ground catacombs or above-ground mausoleums. By the 20$^{th}$ century in most western countries it was common to have a cemetery along with a mausoleum which gave people an option of where to place their loved ones remains.

As time has progressed it has become apparent that burying a dead person, along with a coffin, or placing a dead person and coffin in a mausoleum requires a significant amount of space for each person. The cost of providing a coffin and a cemetery or mausoleum gravesite is also significant.

The answer to this situation has actually also long existed and consists of simply burning the corpse of a dead person. Burning, or cremating, a corpse does not require an expensive coffin and the ashes that remain can be easily buried, placed in a mausoleum, scattered in an appropriate location, or even kept by the family.

Typically, when a loved one's ashes are placed in a mausoleum or kept by the family, a burial or cremation urn is utilized to maintain the ashes. There are many types, styles, shapes and sizes of cremation urns. Unfortunately, there have been problems with cremation urns. It is important to remember that cremated ashes are an organic material. Placing the ashes in a common urn with a simple lid, allows both air and moisture to interact with the ashes, often with negative results. Also urns are sometimes made of a fragile material that if dropped or impacted can break, thereby spilling the ashes.

In order to provide a solution to these problems cremation urns have been developed that include an inner storage container for the ashes and an outer decorative container. Both containers are optimally made of a durable material which will not break if dropped or impacted. Even though these modern cremation urns do solve some of the problems, there is still an issue with the manufacturing process which creates an urn with seams from multiple sections that are attached together. The seams allow air and moisture to enter, which remains one of the major original problems.

The solution is to create/provide a cremation urn that includes an inner ash container surrounded by an outer container, which allows for the safe storage and transportation of ashes. The cremation urn should be manufactured by a method that does not leave any seams or other openings into which air or moisture can enter the urn and damage the ashes within.

A search of the prior art did not disclose any literature or patents that read directly on the claims of the instant invention. However, the following U.S. patents are considered related:

| PAT. NO.      | INVENTOR   | ISSUED        |
| ------------- | ---------- | ------------- |
| 5,203,810     | Davidian   | 20 Apr. 1993  |
| 5,732,452     | Riedel II  | 31 Mar. 1998  |
| 009/0020488A1 | Turkel     | 22 Jan. 2009  |

The U.S. Pat. No. 5,203,810 discloses a method of making a concrete structure, such as a burial vault, having an integrally bonded thermoplastic resin liner. The liner is a rigid molded product having a bottom wall and side walls and an open top. A thermos-setting resin adhesive is applied to the outer surface of the liner and consists of an epoxy resin system, a solvent for the thermoplastic liner, and a surfactant. Before the adhesive is fully cured, wet flowable concrete is applied to the adhesive layer. The solvent acts to solubilize the outer surface of the plastic liner, while the surfactant provides a firmly bonded composite structure.

The U.S. Pat. No. 5,732,452 discloses a dual-layer burial urn comprising a hollow outer decorative casing surrounding an inner resilient liner formed of a high-impact plastic. The outer casing is formed from a base and contains an opening at one end of its body, with a recess surrounding the opening. The inner liner has a screw-threaded aperture aligned with the opening and the recess. An inner plastic top having a screw-threaded portion for engaging the aperture of the inner liner is provided for sealing the inner liner.

The 2009/0020488A1 published patent discloses a shatterproof urn for cremation remains that includes an outer shell defining an interior volume and having an interior surface and an opening for the placement and removal of contents from the interior volume. The outer shell is fabricated from a hard and durable material. A resilient and/or flexible lining is disposed on the interior surface of the outer shell and may partly adhere to the interior surface. A lid is provided and is size for sealed placement over the opening in the outer shell.

For background purposes and indicative of the art to which the invention relates, reference may be made to the following remaining patents found in the patent search.

| PAT. NO.       | INVENTOR        | ISSUED         |
| -------------- | --------------- | -------------- |
| Des.400,683    | Saaf et al      | 3 Nov. 1998    |
| 900,980        | Callahan, et al | 13 Oct. 1908   |
| 1,048361       | Sievert         | 24 Dec. 1912   |
| 1,454,427      | Cunning         | 8 May 1923     |
| 1,484,896      | Mannix          | 26 Feb. 1924   |
| 1,903,197      | Scott           | 28 Mar. 1933   |
| 1,974,666      | Scott           | 25 Sept. 1934  |
| 2,261,651      | Lambert         | 4 Nov. 1941    |
| 3,654,676      | McHugh          | 11 Apr. 1972   |
| 4,170,054      | Ruffner et al   | 9 Oct. 1979    |
| 4,320,562      | Kelley          | 23 Mar. 1982   |
| 4,372,018      | Miller, IV et al| 8 Feb. 1983    |
| 4,823,448      | Martin          | 25 Apr. 1989   |
| 4,854,018      | Von Bratt       | 8 Aug. 1989    |
| 5,157,817      | Davidian        | 27 Oct. 1992   |
| 5,245,733      | Goria           | 21 Sep. 1993   |
| 5,379,499      | Jackson         | 10 Jan. 1995   |
| 5,722,133      | Farris et al    | 3 Mar. 1998    |
| 6,145,175      | Enneking et al  | 14 Nov. 2000   |
| 2010/0088866 A1| Fifer et al     | Pub. 15 Apr. 2010 |
| 2013/0125357 A1| Drew et al      | 23 May 2013    |

-continued

| PAT. NO. | INVENTOR | ISSUED |
|---|---|---|
| 2014/0000075 A1 | Catlett | 2 Jan. 2014 |
| 2014/0090216 A1 | Kotila et al | 3 Apr. 2014 |

DISCLOSURE OF THE INVENTION

In its basic embodiment, the cremation urn is comprised of an internal structure having an opening, an external structure having an opening, and sealing means in the form of a threaded lid. The internal structure is integrally located within the external structure and is placed therein during a proprietary molding manufacturing method. The two structures are molded together, with each respective opening dimensioned to and correspondingly aligned with each other. A threaded flange is attached to, and molded into the opening. A threaded lid with an inner perimeter gasket is then screwed into the flange, thereby creating a one-piece, seamless, air-tight and water-tight cremation urn. The materials utilized to manufacture the urn produce an appearance and texture of real marble. This type of simulated synthetic marble is commonly known as cultured marble which is a cast polymer product. In addition to the manufacturing method that produces a one-piece cremation urn, an alternate manufacturing method can be utilized that provides a two-piece cremation urn with a separate lower surface that is attached onto the external structure. The two-piece manufacturing method is more economical but does not produce a cremation urn that is as structurally sound as the one-piece seamless method, or possess the air-tight and water-tight attributes.

In view of the above disclosure, the primary object of the invention is to produce a high quality cultured marble cremation urn that utilizes a one-piece design to produce an aesthetically pleasing seamless, air-tight and water-tight urn that is made by a proprietary manufacturing method.

In addition to the primary object of the invention, it is also an object of the invention to produce a cultured marble cremation urn that:

can be made in various sizes,
can be made in various shapes,
can be made of various materials,
can be made in various colors,
has the appearance of real marble,
is durable and will remain intact for an extended time even when buried in the ground,
provides a safe and secure repository for ashes within the urn,
can be custom made to an individual's family's or friend's specifications,
is more earth-friendly than other burial devices such as a coffin,
has an under-stated attractive appearance that would not be obtrusive or awkward in a home, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred structural embodiment of, and multiple manufacturing methods for, a cremation urn. In the modern world, especially in developed nations, there are two primary ways of dealing with a dead human body. The first way is to bury the body along with a coffin, or place the body and coffin in an above-ground mausoleum. Both burying in the ground and placing a body and coffin in a mausoleum require a significant financial cost. More importantly, both of these require an amount of space that is becoming less available.

The second way of dealing with a dead human body is to burn or cremate the body. In regard to space requirements, cremation is preferred since all that remains after cremation are a relatively small amount of ashes, which are then placed in a suitable container, which typically consists of an urn.

The problem is that many cremation urns are actually not suitable for human ashes. The instant cremation urn offers a solution to this by providing a cremation urn that has an internal structure for maintaining and protecting the ashes, and an external structure that encases and protects the internal structure. The instant cremation urn has an aesthetically pleasing appearance while providing a safe and secure location to maintain human ashes either for burial, placement in a mausoleum, or keeping in a home or other location.

The cremation urn 10, as shown in FIGS. 1-11, is comprised of the following major elements: an internal structure 12, an external structure 38, and sealing means 68 in the form of a lid 70.

The internal structure 12, as shown in FIGS. 1-6, is preferably made of plastic by a blow mold process. Other materials, including rubber, metal, concrete, wood, ceramic, glass, fiberglass, biodegradable material or other synthetics can also be utilized. The internal structure 12 is preferably substantially rectangular in shape, but can be made in any geometric or non-geometric shape. For the purpose of this disclosure, the substantially rectangular design will be described and shown.

The internal structure 12 has an outer surface 14, an inner surface 16, a first side surface 18, a second side surface 20, a third side surface 22, a fourth side surface 24, an upper surface 26, and a lower surface 28. As shown in FIGS. 1, 2, 3 and 6, along each side of the internal structure's upper surface extends an upward and inward section 30 that terminates at the substantially flat upper surface 26. Located on the lower surface 28 is an opening 32, as shown in FIG. 7. Prior to molding the urn, a threaded flange 34 is attached to the opening 32.

Figure 1:
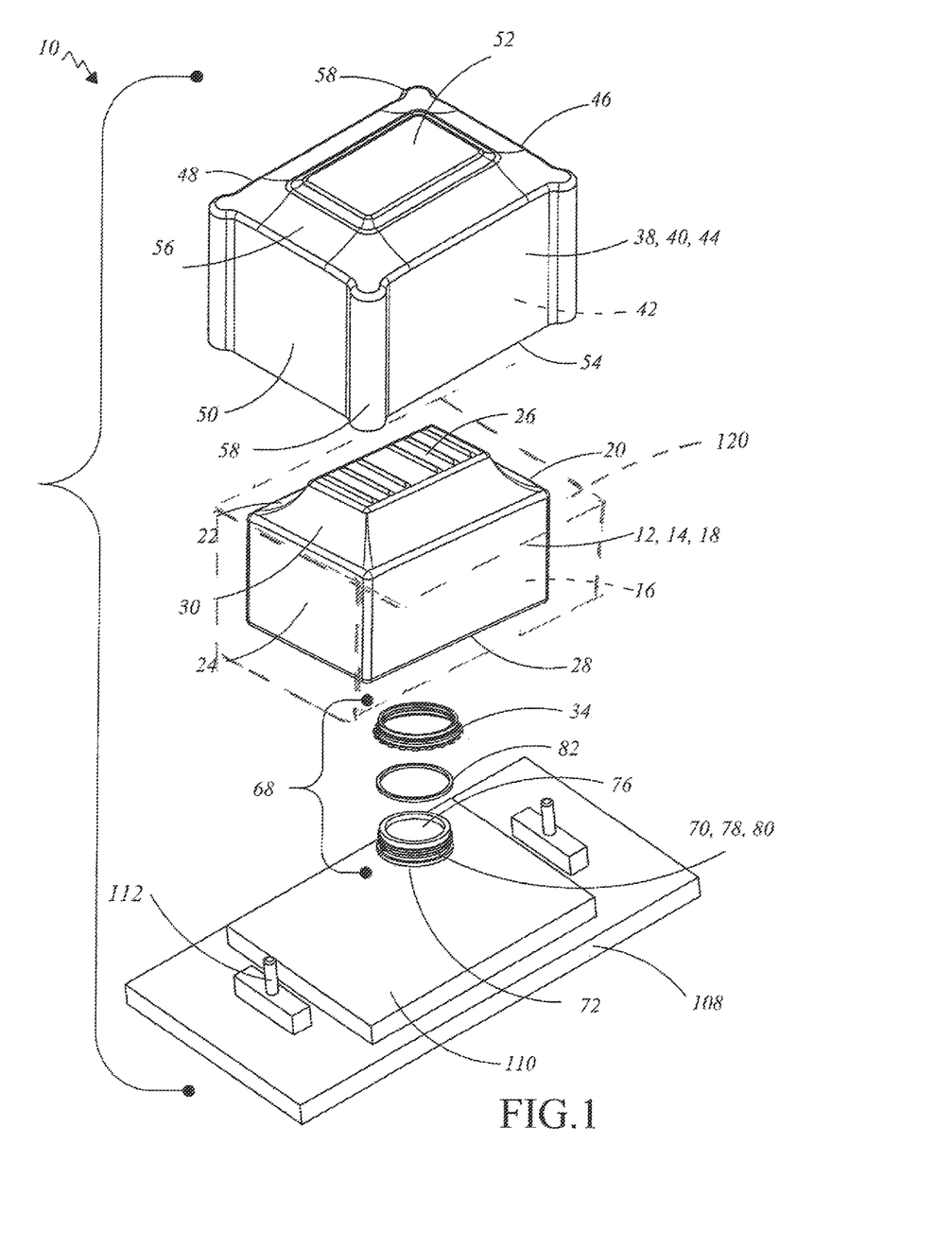
FIG. 1 is an orthographic exploded view of the cremation urn showing the external structure, the internal structure and the elements of the sealing means.
Figure 2:
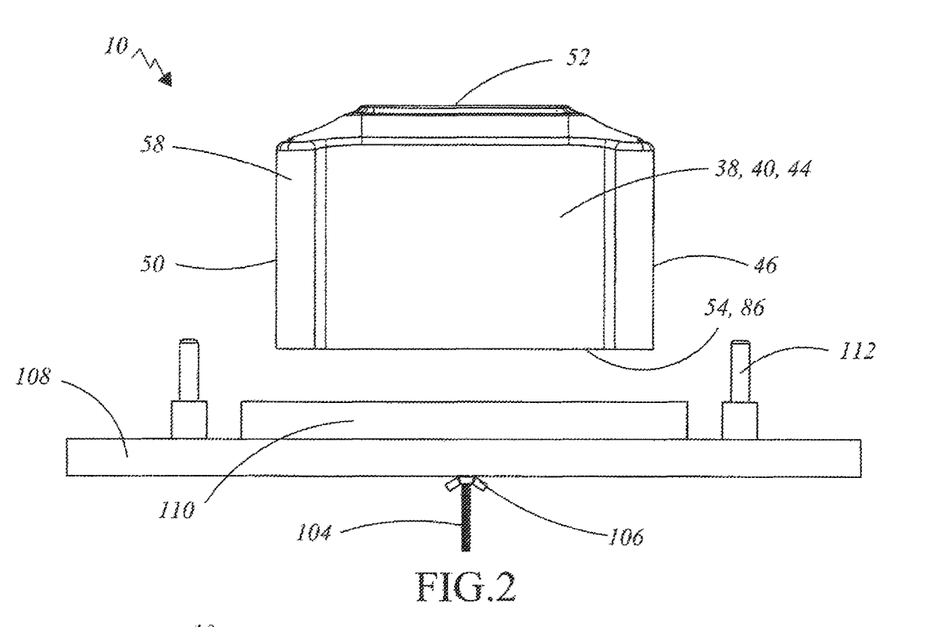
FIG. 2 is a front elevational view of a cremation urn.
Figure 3:
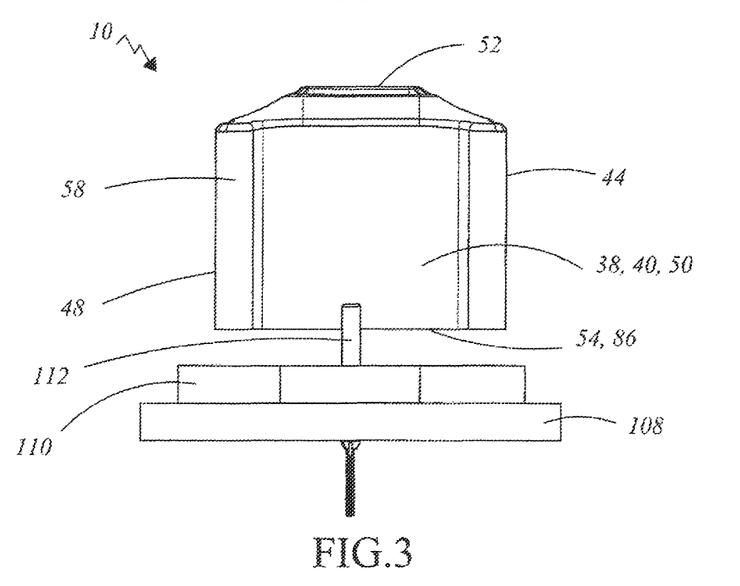
FIG. 3 is a side elevational view of the cremation urn.
Figure 4:
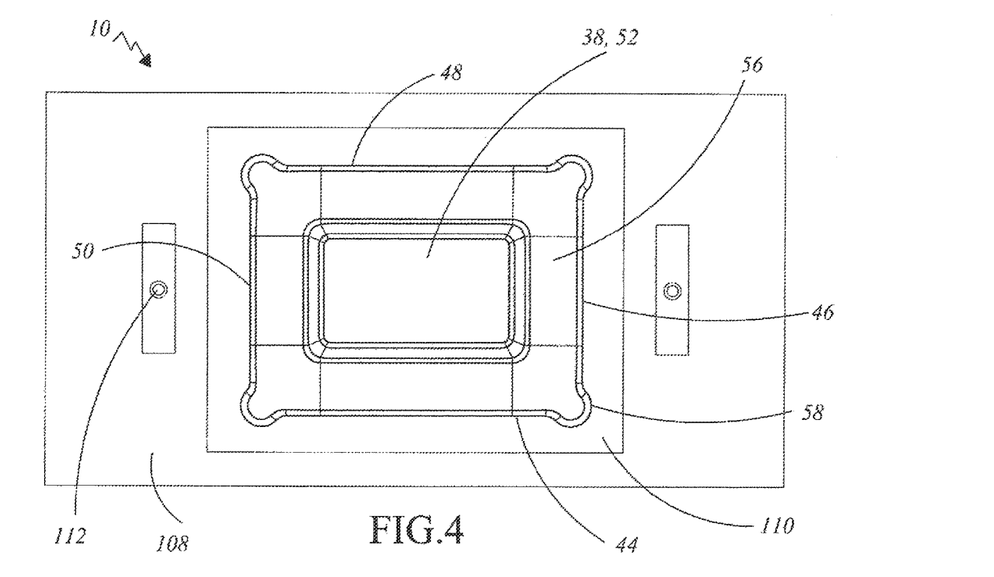
FIG. 4 is a top plan view of the cremation urn.
Figure 5:
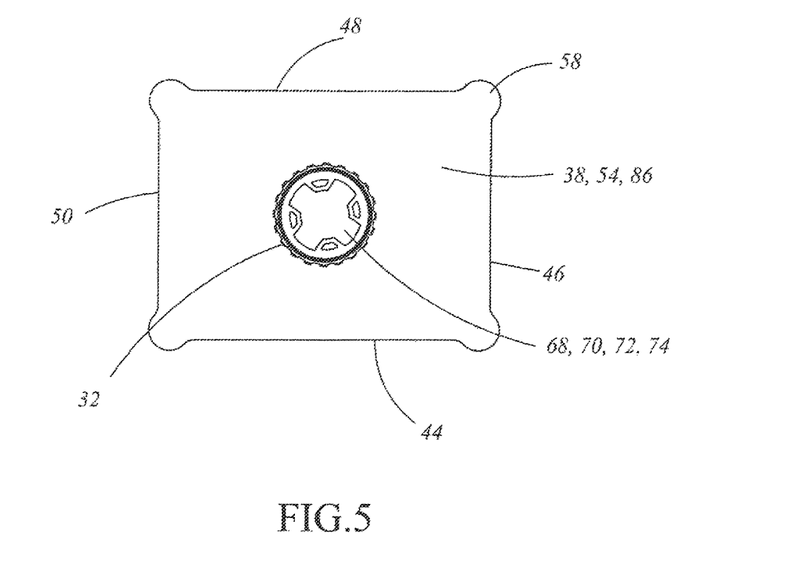
FIG. 5 is a bottom plan view of the cremation urn.
Figure 6:
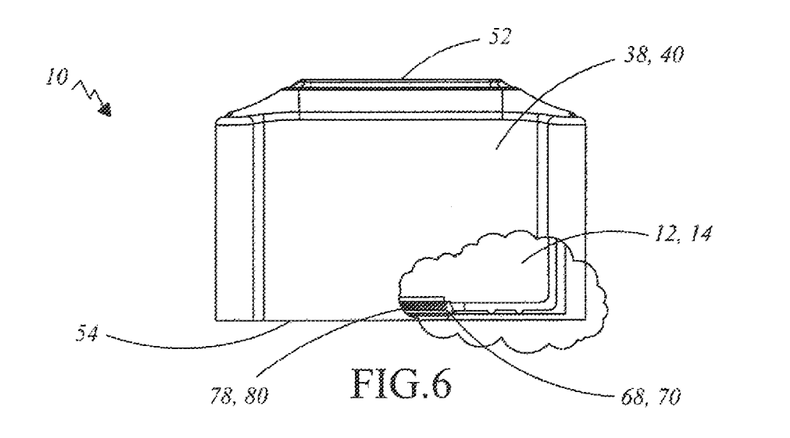
FIG. 6 is a cut-a-way view of the cremation urn showing a corner of an internal structure.
Figure 7:
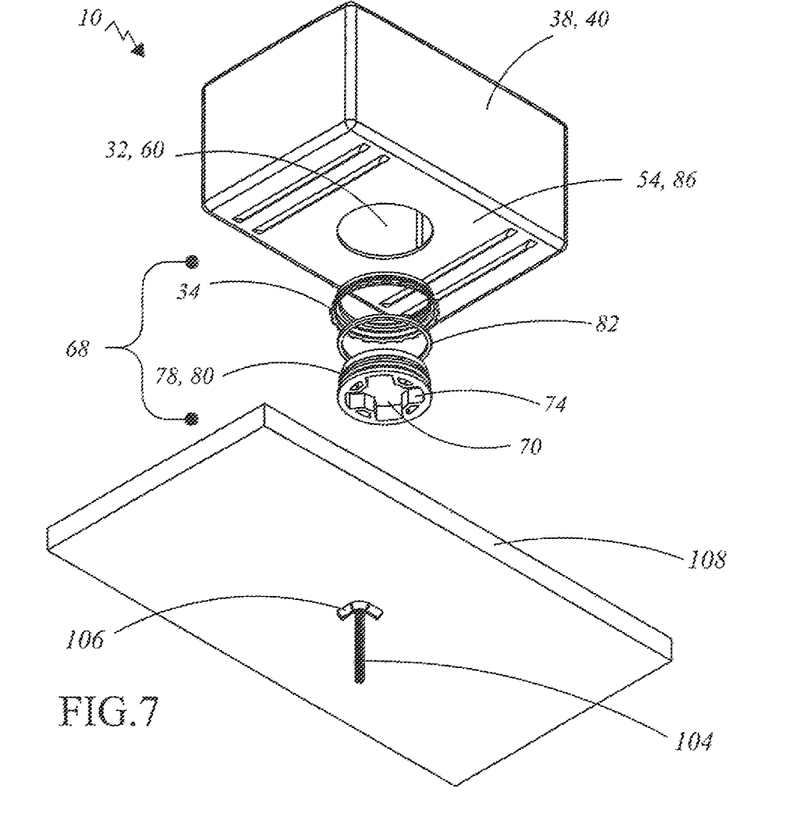
FIG. 7 is an orthographic bottom view of the cremation urn showing an exploded view of sealing means comprising a threaded flange, threaded lid and gasket.

The external structure 38, as shown in FIGS. 1-7, is preferably made of a material known as cultured marble, which is a synthetic material that has the appearance and texture of real marble. The external structure 38 is made by a molding manufacturing method. Although cultured marble is the preferred material, the external structure 38 can be made of other materials including rubber, plastic, metal, concrete, wood, ceramic, glass, fiberglass, biodegradable material or other synthetics. The shape of the external structure 38 corresponds to the shape of the internal structure 12, with the external structure 38 dimensioned slightly larger to allow the internal structure to be placed within the external structure, as shown in FIGS. 1 and 6. As shown in FIGS. 1, 2 and 3, the external structure 38 has an outer surface 40, an inner surface 42, a first side surface 44, a second side surface 46, a third side surface 48, a fourth side surface 50, an upper surface 52 and a lower surface 54. As with the internal structure, along each side of the external structure's upper surface extends an upward and inward section 56 that terminates at the substantially flat upper surface 52. Also, at each corner where the respective sides interface is a rounded section 58, as shown in FIGS. 1, 2 and 3, which provides an aesthetic column. Located on the lower surface of the external structure 38 is an opening 60 that is dimensioned to and correspondingly aligned with the opening 32 on the internal structure 12. After the urn 10 is made, the two openings 32,60 allow human remains in the form of ashes to be placed into the internal structure 12.

In order to maintain the ashes within the urn 10, the sealing means 68 is utilized. As shown in FIGS. 1, 5 and 7, the sealing means 68 is in the form of a lid 70 comprising an outer surface 72 with an indented area having at least one finger tab 74, an inner surface 76, an outer perimeter 78 with threads 80 that correspond to the threads on the flange 34, and a gasket 82 to provide a tight seal of the lid. A lid 70 having four finger tabs 74, is shown in FIGS. 5 and 7. To access the internal structure 12, or to seal the urn 10 once ashes have been placed within the urn, the lid 70 is screwed into or out of the threaded flange. Since the lid 70 sits flush with the outer surface of the external structure 38, the finger tabs 74 allow a person to acquire a grasp of the lid and to rotate the lid when screwing the lid on or off. Additionally, a lid 70 without finger tabs can also be effectively utilized.

After an urn 10 has been made, a flocking material 86 is applied onto the lower surface of the external structure 38, as shown in FIGS. 5 and 7. The flocking material is either a sprayed substance or pre-cut to size flocked craft paper with pressure sensitive coating, which is also known as an adhesive.

Figure 8:
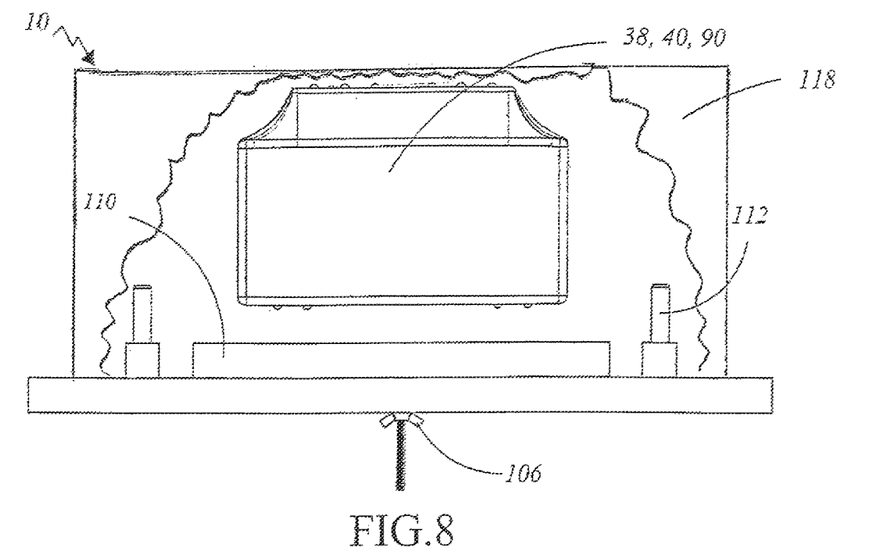
FIG. 8 is a front elevational view of the cremation urn showing the external structure of the urn with the appearance including color and veining of marble.

As previously disclosed the cremation urn is preferably made of cultured marble by a manufacturing method comprised of molding. The cultured marble material produces an urn with an attractive appearance of real marble, complete with marble color and veining 90, as shown in FIG. 8. Preferably the molds used to fabricate the external structure are made of fiberglass, but the molds can be made of other materials including metal, rubber or concrete.

Figure 9:
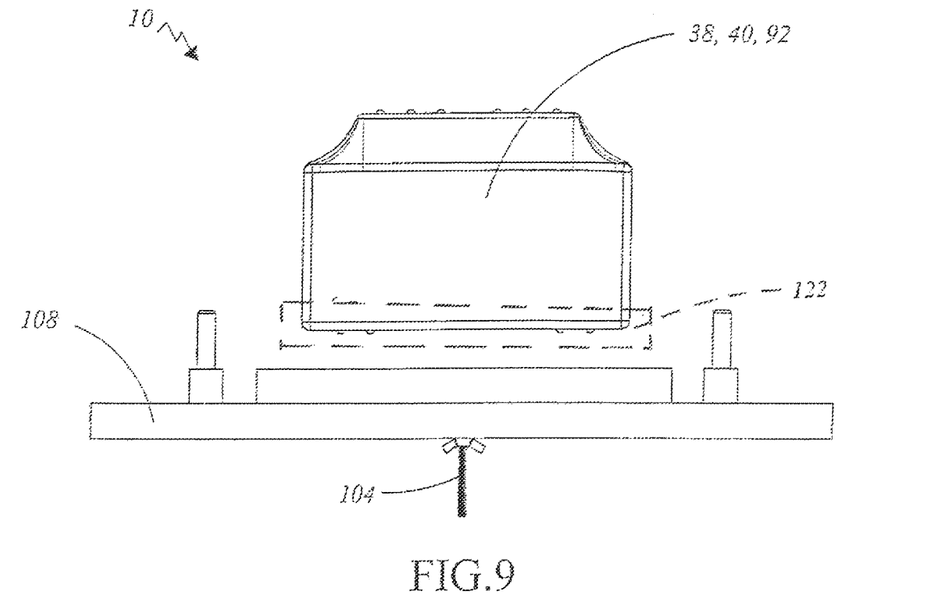
FIG. 9 is a front elevational view of the cremation urn showing the external structure of the urn having a vinyl wrap.
Figure 10:
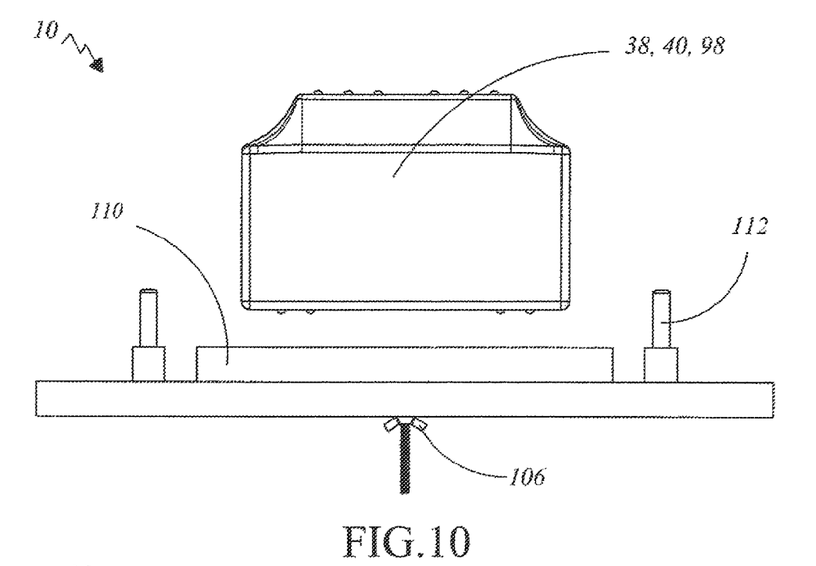
FIG. 10 is a front elevational view of the cremation urn showing the external structure of the urn painted.
Figure 11:
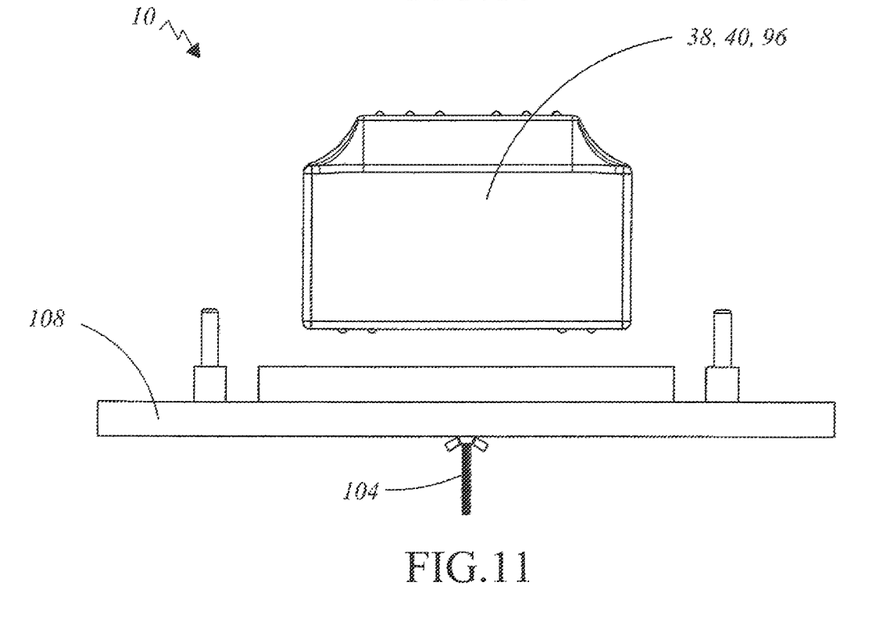
FIG. 11 is a front elevational view of the cremation urn showing the external structure of the urn with spray stone applied.

During manufacture a pigment is added to produce the color and marble appearance of the urn 10. If desired, the pigment can be omitted which results in an urn with a comparatively un-attractive creamy brown appearance. Omitting the pigment is utilized when other outward appearances of the urn are desired. Some examples of other appearances include: a vinyl wrap 52 that tightly adheres to the outer surface of the external structure 38. The wrap 52, as shown in FIG. 9, can be any color or have any image printed thereon. Another alternate appearance is a simple painted external structure, as shown in FIG. 10. The paint 98 can be applied by spray or brush and can be any conceivable color or any image desired. Similar to paint is a finish known as spray stone or spray granite which, as its name implies is sprayed onto the external structure's outer surface and gives the appearance of natural stone or rock, as shown in FIG. 11. When an urn is made of metal or plastic, the outer surface can be plated with a material such as chrome or gold (not shown). An aluminum urn can have an anodized surface. These are examples to indicate that the instant cremation urn 10 is not limited to any specific material or appearance/finish option. Additionally, to add to the appearance and/or functionality of the urn 10, text, either applied such as with paint or engraved, and/or images such as a photograph of the deceased person, can be placed on the external structure's outer surface. Other images that reflect the deceased person's interests or hobby can also be utilized.

There are two main manufacturing methods. The first, preferred method is comprised of the following steps:

A. Acquire a blow mold 120 for an urn internal structure, wherein the blow mold has an opening in a lower section.

B. Attach a threaded flange with no drain holes to the blow mold, with the flange being locked into the opening to create a tight seal and fit.

C. Insert a toggle bolt 104 into the blow mold with the threaded shaft of the bolt passing through a center section of a plastic support holder 110 for the flange.

D. Continue inserting the bolt's threaded shaft through an opening on a weighted metal plate which has metal stud supports to stabilize and maintain the blow mold attached to the plate.

E. Secure the toggle bolt with a wing nut 106.

F. Acquire a mold 118 for an urn external structure.

G. Prepare the mold by applying to an inner surface a coating of release agent.

H. Apply unsaturated polyester clear gel coat monomer to the mold 118, and allow to air dry.

I. Prepare a matrix for the external structure utilizing unsaturated polyester resin.

J. Add methyl ethyl ketone peroxide or benzoyl peroxide which functions as a catalyst to cure the matrix at room temperature.

K. Add calcium carbonate fillers or aluminum trihydrates to the resin.

L. Add organic or inorganic pigments or titanium dioxide to the matrix to create a desired color.

M. Insert the matrix into the mold 118 and pull the matrix up on the sides of the mold.

N. Insert the internal structure blow mold 120 with weighted metal plate 108 attached into a cavity in the external structure mold.

O. Align guide pins 112 with openings in the external structure mold 118, thereby centering the internal blow mold 120 within the external mold.

P. Allow the matrix to flow on all sides and bottom of the external mold 118.

Q. Vibrate the external mold 118 to level the matrix and to fill any empty voids between the internal blow mold 120 and the external structure.

R. Allow the matrix within the external mold 118 to cure.

S. Loosen the toggle bolt 104 which allows the weighted metal plate 108 to be removed.

T. Remove the toggle bolt 120 and wing nut 106 from the internal blow mold.

U. Remove from the mold 118 the complete urn which comprises the urn external structure and the urn internal structure within the external structure.

V. Sand the lower surface of the urn.

W. Fill any voids and air pockets on lower surface with a filling compound, then sand lower surface.

X. Buff exterior surfaces of urn.

Y. Apply epoxy paint onto the urn's lower surface.

Z. Spray rayon flocking material onto urn's lower surface.

AA. Wipe edges of urn's lower surface with acetone.

BB. Vacuum interior of blow mold.

CC. Screw a removable sealing means in the form of a threaded lid 70 onto the threaded flange in the opening which extends through both the internal structure and the external structure.

The second alternate method is similar to the first method except a separate, pre-made lower surface is utilized instead of the one-piece design of the first method. The second method comprises the following steps:

A. Acquire a mold 122 for an urn lower surface having an opening and an attached threaded flange 34.

B. Prepare a resin matrix.

C. Insert the resin matrix into the lower surface mold 122 and allow to cure.

D. Remove the urn lower surface from the mold 122.

E. Acquire a blow mold 120 for an urn internal structure, wherein the blow mold has an opening on a lower surface.

F. Insert a toggle bolt 104 having a nut into the blow mold 120 with the threaded shaft of the bolt passing through the flange opening.

G. Continue inserting the bolt's threaded shaft through an opening on a weighted metal plate 108.

H. Secure the toggle bolt 104 with a wing nut 106.

I. Acquire a mold 118 for an urn external structure.

J. Prepare the mold 118 by applying to the inner surface a coating of release agent.

K. Apply unsaturated polyester clear gel coat monomer to the mold 118, and allow to air dry.

L. Prepare a matrix for the external structure utilizing unsaturated polyester resin.

M. Add methyl ethyl ketone peroxide or benzoyl peroxide which functions as a catalyst to cure the matrix at room temperature.

N. Add calcium carbonate fillers or aluminum trihydrates to the resin.

O. Add organic or inorganic pigments or titanium dioxide to the matrix to create a desired color.

P. Insert the matrix into the mold and pull the matrix up on the sides of the mold 118.

Q. Insert the internal structure blow mold 120 with weighted metal plate 108 attached into a cavity in the external structure mold 118.

R. Allow the matrix to flow on all sides of the external mold 118.

S. Vibrate the external mold 118 to level the matrix and to fill any empty voids between the internal blow mold 120 and the external structure.

T. Allow the matrix within the external mold 118 to cure.

U. Loosen the toggle bolt nut 106 which allows the weighted metal plate 108 to be removed.

V. Remove the toggle bolt 106 from the internal blow mold 118.

W. Remove from the mold 118 the complete urn which comprises the urn external structure and the urn internal structure within the external structure.

X. Sand the lower surface of the urn.

Y. Remove the external structure with the internal structure from the mold 118.

Z. Attach by an attachment means the pre-made lower surface to the bottom of the external structure, with the opening on the lower surface aligned with the opening on the internal structure.

AA. Lightly sand the lower surface of the urn.

BB. Apply a pre-cut flocking material to the lower surface of the urn, and

CC. Screw a removable sealing means in the form of a threaded lid 70 onto the threaded flange 34 in the opening which extends through both the internal structure and the external structure.

Although the above two methods are the most widely used, the instant cremation urn 10 should not be limited to those only. Other methods can also be employed. For example, a manufacturing method that utilizes component parts of an urn. Each of the component parts, such as the side surfaces, the upper surface, etc. can be manually alternated together by an attachment means. No mold is utilized and the attachment means can be comprised of an adhesive, a plurality of screws, or nuts and bolts. Obviously, an urn manufactured by this method would not be as high quality or possess the air-tight and water-tight attributes as the previously disclosed preferred first method, but a cremation urn having an internal structure and an external structure could still be realized.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A method of manufacture of a cremation urn, wherein said method comprises the following steps:
   a) acquire a blow mold for an urn internal structure, wherein the blow mold has an opening in a lower section,
   b) attach a threaded flange with no drain holes to the blow mold, with the flange being locked into the opening to create a tight seal and fit,
   c) insert a toggle bolt into the blow mold with the threaded shaft of the bolt passing through a center section of a plastic support holder for the flange,
   d) continue inserting the bolt's threaded shaft through an opening on a weighted metal plate which has metal stud supports to stabilize and maintain the blow mold attached to the plate,
   e) secure the toggle bolt with a wing nut,
   f) acquire a mold for an urn external structure,
   g) prepare the mold by applying to the inner surface a coating of release agent,
   h) apply unsaturated polyester clear gel coat monomer to the mold, and allow to air dry,
   i) prepare a matrix for the external structure utilizing unsaturated polyester resin,
   j) add methyl ethyl ketone peroxide or benzoyl peroxide which functions as a catalyst to cure the matrix at room temperature,
   k) add calcium carbonate fillers or aluminum trihydrates to the resin, l) add organic or inorganic pigments or titanium dioxide to the matrix to create a desired color,
m) insert the matrix into the mold and pull the matrix up on the sides of the mold,
n) insert the internal structure blow mold with weighted metal plate attached into a cavity in the external structure mold,
o) align guide pins with openings in the external structure mold, thereby centering the internal blow mold within the external mold,
p) allow the matrix to flow on all sides and bottom of the external mold,
q) vibrate the external mold to level the matrix and to fill any empty voids between the internal blow mold and the external structure,
r) allow the matrix within the external mold to cure,
s) loosen the toggle bolt which allows the weighted metal plate to be removed,
t) remove the toggle bolt and wing nut from the internal blow mold,
u) remove from the mold the complete urn which comprises the urn external structure and the urn internal structure within the external structure,
v) sand the lower surface of the urn,
w) fill any voids and air pockets on lower surface with a filing compound, then said lower surface,
x) buff exterior surfaces of the urn,
y) apply epoxy paint onto the urn's lower surface,
z) spray rayon flocking material onto the urn's lower surface,
aa) wipe edges of the urn's lower surface with acetone,
bb) vacuum interior of the blow mold,
cc) screw a removable sealing means in the form of a threaded lid onto the threaded flange in the opening which extends through both the internal structure and the external structure.

2. The cremation urn as specified in claim 1 wherein said completed urn is a one-piece, air-tight and water-tight structure.

3. The cremation urn as specified in claim 1 wherein the materials that are formulated and used in said manufacturing method produce the urn with a marble appearance.

4. A method of manufacture of a cremation urn, wherein said method comprises the following steps:
   a) acquire a mold for an urn lower surface having an opening and an attached threaded flange,
   b) prepare a resin matrix,
   c) insert the resin matrix into the lower surface mold and allow to cure,
   d) remove the urn lower surface from the mold,
   e) acquire a blow mold for an urn internal structure, wherein the blow mold has an opening on a lower surface,
   f) insert a toggle bolt having a nut into the blow mold with the threaded shaft of the bolt passing through the flange opening,
   g) continue inserting the bolt's threaded shaft through an opening on a weighted metal plate,
   h) secure the toggle bolt with a wing nut,
   i) acquire a mold for an urn external structure,
   j) prepare the mold by applying to the inner surface a coating of release agent,
   k) apply unsaturated polyester clear gel coat monomer to the mold, and allow to air dry,
   l) prepare a matrix for the external structure utilizing unsaturated polyester resin,
   m) add methyl ethyl ketone peroxide or benzoyl peroxide which functions as a catalyst to cure the matrix at room temperature,
   n) add calcium carbonate fillers or aluminum trihydrates to the resin,
   o) add organic or inorganic pigments or titanium dioxide to the matrix to create a desired color,
   p) insert the matrix into the mold and pull the matrix up on the sides of the mold,
   q) insert the internal structure blow mold with weighted metal plate attached into a cavity in the external structure mold,
   r) allow the matrix to flow on all sides of the external mold,
   s) vibrate the external mold to level the matrix and to fill any empty voids between the internal blow mold and the external structure,
   t) allow the matrix within the external mold to cure,
   u) loosen the toggle bolt nut which allows the weighted metal plate to be removed,
   v) remove the toggle bolt from the internal blow mold,
   w) remove from the mold the complete urn which comprises the urn external structure and the urn internal structure within the external structure,
   x) sand the lower surface of the urn,
   y) attach by an attachment means the pre-made lower surface to the bottom of the external structure, with the opening on the lower surface aligned with the opening on the internal structure,
   z) lightly sand the lower surface of the urn,
   aa) apply a pre-cut flocking material to the lower surface of the urn, and
   bb) screw a removable sealing means in the form of a threaded lid onto the threaded flange in the opening which extends through both the internal structure and the external structure.

5. A method of manufacture of a cremation urn, wherein said method comprises the following steps:
   a) acquire a mold for an urn lower surface having an opening and an attached threaded flange,
   b) prepare a resin matrix,
   c) insert the resin matrix into the lower surface mold and allow to cure,
   d) remove the urn lower surface from the mold,
   e) acquire a blow mold for an urn internal structure, wherein the blow mold has an opening on a lower surface,
   f) insert a toggle bolt having a nut into the blow mold with the threaded shaft of the bolt passing through the flange opening,
   g) continue inserting the bolt's threaded shaft through an opening on a weighted metal plate,
   h) secure the toggle bolt with a wing nut,
   i) acquire a mold for an urn external structure,
   j) prepare the mold by applying to the inner surface a coating of release agent,
   k) apply unsaturated polyester clear gel coat monomer to the mold, and allow to air dry,
   l) prepare a matrix for the external structure utilizing unsaturated polyester resin,
   m) add methyl ethyl ketone peroxide or benzoyl peroxide which functions as a catalyst to cure the matrix at room temperature,
   n) add calcium carbonate fillers or aluminum trihydrates to the resin,
   o) add organic or inorganic pigments or titanium dioxide to the matrix to create a desired color, p) insert the matrix into the mold and pull the matrix up on the sides of the mold,
q) insert the internal structure blow mold with weighted metal plate attached into a cavity in the external structure mold,
r) allow the matrix to flow on all sides of the external mold,
s) vibrate the external mold to level the matrix and to fill any empty voids between the internal blow mold and the external structure,
t) the matrix within the external allow mold to cure,
u) loosen the toggle bolt nut which allows the weighted metal plate to be removed,
v) remove the toggle bolt from the internal blow mold,
w) remove from the mold the complete urn which comprises the urn external structure and the urn internal structure within the external structure,
x) sand the lower surface of the urn,
y) attach by an attachment means the pre-made lower surface to the bottom of the external structure, with the opening on the lower surface aligned with the opening on the internal structure,
z) lightly sand the lower surface of the urn,
aa) apply a pre-cut flocking material to the lower surface of the urn, and
bb) screw a removable sealing means in the form of a threaded lid onto the threaded flange in the opening which extends through both the internal structure and the external structure, wherein said completed urn is a one-piece, air-tight and water-tight structure.

6. A method of manufacture of a cremation urn, wherein said method comprises the following steps:
a) acquire a mold for an urn lower surface having an opening and an attached threaded flange,
b) prepare a resin matrix,
c) insert the resin matrix into the lower surface mold and allow to cure,
d) remove the urn lower surface from the mold,
e) acquire a blow mold for an urn internal structure, wherein the blow mold has an opening on a lower surface,
f) insert a toggle bolt having a nut into the blow mold with the threaded shaft of the bolt passing through the flange opening,
g) continue inserting the bolt's threaded shaft through an opening on a weighted metal plate,
h) secure the toggle bolt with a wing nut,
i) acquire a mold for an urn external structure,
j) prepare the mold by applying to the inner surface a coating of release agent,
k) apply unsaturated polyester clear gel coat monomer to the mold, and allow to air dry,
l) prepare a matrix for the external structure utilizing unsaturated polyester resin,
m) add methyl ethyl ketone peroxide or benzoyl peroxide which functions as a catalyst to cure the matrix at room temperature,
n) add calcium carbonate fillers or aluminum trihydrates to the resin,
o) add organic or inorganic pigments or titanium dioxide to the matrix to create a desired color,
p) insert the matrix into the mold and pull the matrix up on the sides of the mold,
q) insert the internal structure blow mold with weighted metal plate attached into a cavity in the external structure mold,
r) allow the matrix to flow on all sides of the external mold,
s) vibrate the external mold to level the matrix and to fill any empty voids between the internal blow mold and the external structure,
t) the matrix within the external allow mold to cure,
u) loosen the toggle bolt nut which allows the weighted metal plate to be removed,
v) remove the toggle bolt from the internal blow mold,
w) remove from the mold the complete urn which comprises the urn external structure and the urn internal structure within the external structure,
x) sand the lower surface of the urn,
y) attach by an attachment means the pre-made lower surface to the bottom of the external structure, with the opening on the lower surface aligned with the opening on the internal structure,
z) lightly sand the lower surface of the urn,
aa) apply a pre-cut flocking material to the lower surface of the urn, and
bb) screw a removable sealing means in the form of a threaded lid onto the threaded flange in the opening which extends through both the internal structure and the external structure, wherein the attachment means for attaching the lower surface to the bottom of the external structure is comprised of an adhesive.

* * * * *